May 19, 1925.
W. M. TROUT
MOTOR VEHICLE BODY
Filed April 7, 1922
1,538,364
2 Sheets-Sheet 1
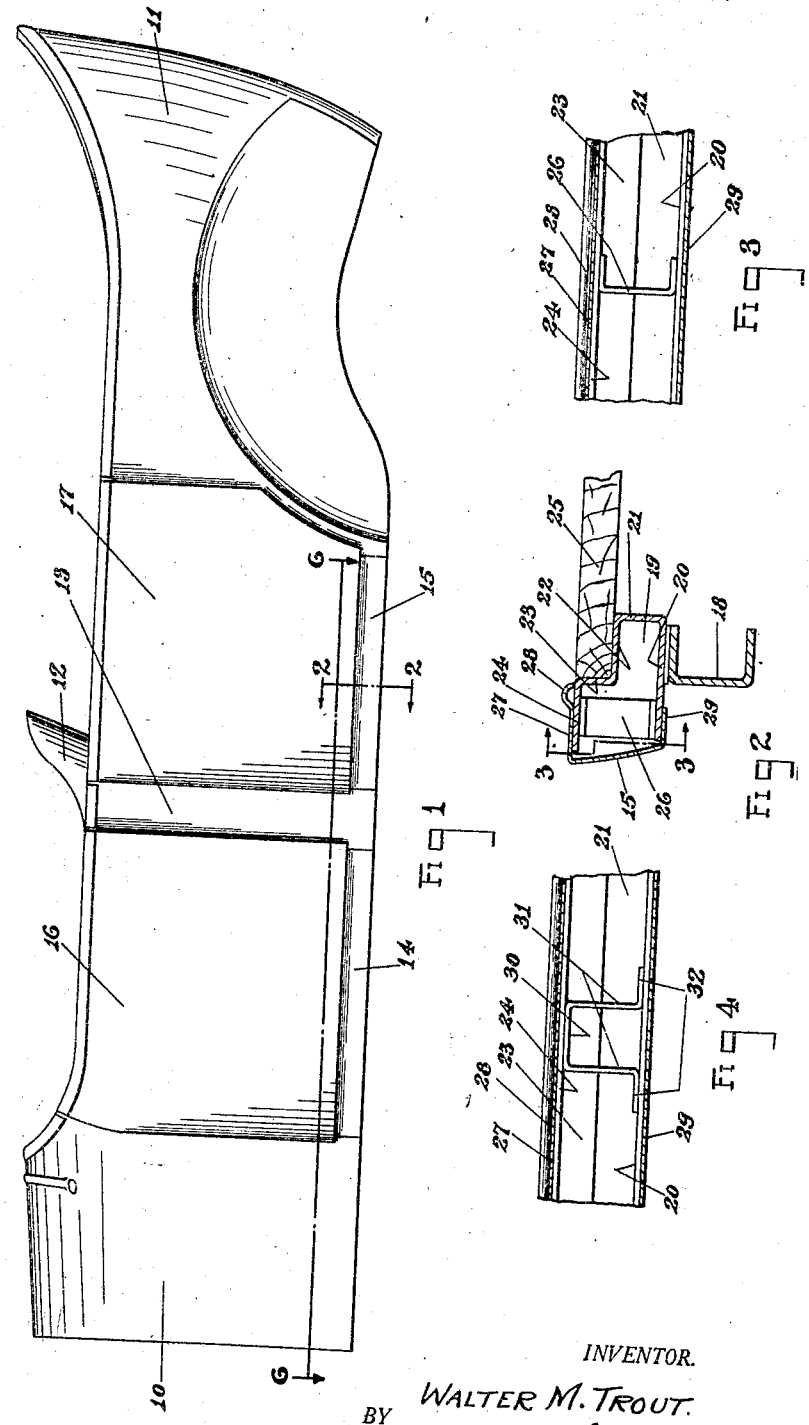
WITNESS:-
INVENTOR.
BY WALTER M. TROUT.
ATTORNEY.

May 19, 1925.

W. M. TROUT

MOTOR VEHICLE BODY

Filed April 7, 1922 2 Sheets-Sheet 2

1,538,364

INVENTOR.
WALTER M. TROUT.
BY
C.B. DesJardins
ATTORNEY.

WITNESS:-
M. L. Keller

Patented May 19, 1925.

1,538,364

UNITED STATES PATENT OFFICE.

WALTER M. TROUT, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

MOTOR-VEHICLE BODY.

Application filed April 7, 1922. Serial No. 550,280.

*To all whom it may concern:*

Be it known that I, WALTER M. TROUT, a citizen of the United States, residing at Philadelphia, Pennsylvania, have invented certain new and useful Improvements in Motor-Vehicle Bodies, of which I declare the following to be a full, clear, and exact description.

This invention relates to improvements in motor vehicle bodies and has to do, more particularly, with bodies constructed entirely of metal. My invention is an improvement upon the inventions disclosed in the pending applications of Joseph Ledwinka, Serial No. 290,787, for sheet metal body structures for automobiles, and Serial No. 431,732, for motor vehicles.

My invention relates particularly to an improved sill construction for automobile bodies and the principal object of my invention is to provide a straight sill construction, for use in the manufacture of bodies constructed entirely of metal, which is inexpensive to manufacture and very strong and durable in construction.

A further object of my invention is to provide an automobile body sill construction which may be constructed without the use of expensive dies for pressing the sills to the desired shape and contour to conform with the sides of the automobile body.

Another object of my invention is to provide an automobile body sill construction in which a blank is formed having edges cut to conform to the curvature of the sides of the automobile body and the sill is formed from said blank by straight bending or flanging operations which do not necessitate the use of forming dies.

Another object of my invention is to provide an automobile body sill construction in which the same blanks may be used for forming both the right-hand and left-hand sills of the body, thus reducing the cost of construction.

Another object of my invention is to provide an automobile body sill construction provided with a straight girder portion in line with the side member of the chassis frame, to which the sill is secured, said sill cooperating with and being secured to the side panels of the body so as to form very strong box girders beneath the door openings or thresholds.

Another object of my invention is to provide an automobile body sill construction comprising a channel member disposed on its side and having one side wall thereof secured to the flange or flanges at the lower edges of the side panels of the body.

Further objects, and objects relating to details and economies of construction and operation, will definitely appear from the detailed description to follow. In one instance I accomplish the objects of my invention by the devices and means described in the following specification. My invention is clearly defined and pointed out in the appended claims. A structure constituting a preferred embodiment of my invention is illustrated in the accompanying drawings, forming a part of this specification, in which:

Fig. 1 is a view in side elevation of an automobile body embodying my invention.

Fig. 2 is a sectional view through the sill and chassis frame, taken on line 2—2 of Fig. 1.

Fig. 3 is a detail sectional view, taken on line 3—3 of Fig. 2.

Fig. 4 is a detail sectional view, corresponding to Fig. 3, but showing a modified form of bracing member for the sill.

In the drawings, the same reference numerals refer to the same parts throughout the several views and the sectional views are taken looking in the direction of the arrows at the ends of the section lines.

In general, I accomplish the objects of my invention by providing a channel-shaped sill member which is assembled and secured in the body on its side with the base of the channel member disposed in a vertical plane. The sides of an automobile body are usually curved to conform to the body lines and the laterally-extending flange or flanges at the lower edges of these curved side panels are usually secured to the body sills. In accordance with my invention, I cut one or the other or both of the free edges of the side walls of the channel sills so as to conform to the curvature of the side panels and said edge or edges extend adjacent the inner surfaces of the side panels, when the sill is assembled and secured in position. The base of the channel is constituted by a plane surface which extends at right angles to the side walls and this portion of the channel may be formed by a straight bending or flanging operation and without the need of a forming die. The base of the channel constitutes a girder extending longitudinally straight throughout the length of the body sill, so that, by this means, I am enabled to provide a straight sill construction, the importance of which is pointed out in the co-pending applications of Joseph Ledwinka above referred to. The inturned flange at the lower edge of the side panel may be secured to the lower side wall of the channel sill and the upper side wall of this sill may be flanged to provide a seat for receiving the ends of the floor boards.

Figure 6:
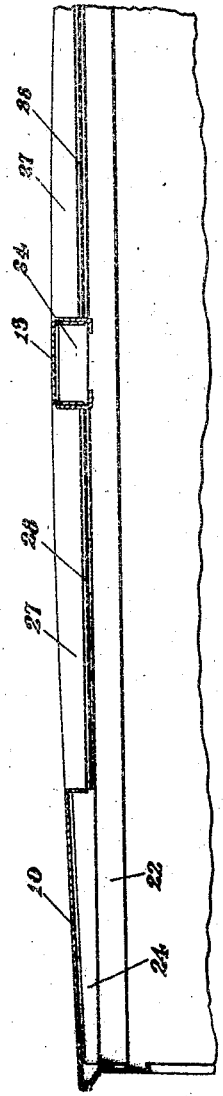
Fig. 6 is a fragmentary, sectional view taken on the line 6—6 of Fig. 1.
Figure 5:
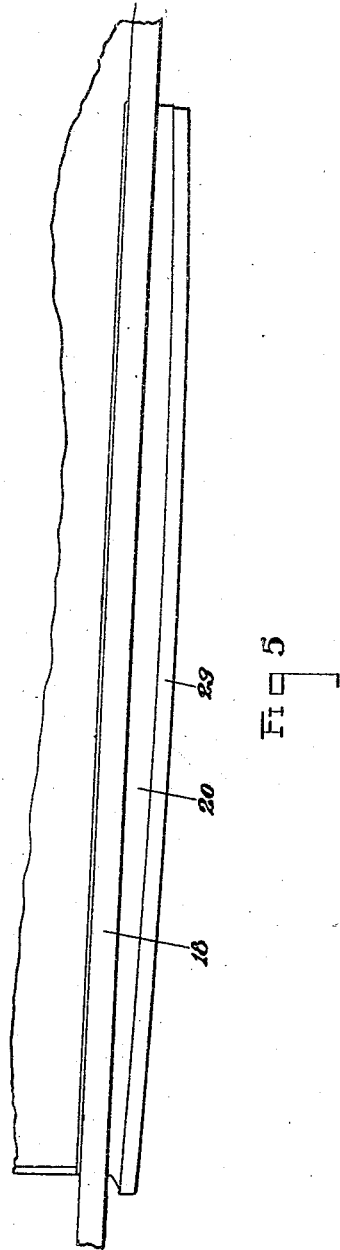
Fig. 5 is a fragmentary, bottom-plan view of a portion of the automobile body, showing the relation of the chassis frame to the sill.

I have illustrated, in the accompanying drawings, an automobile body employing a sill constructed in accordance with my invention. Referring to the numbered parts of the drawing, this body comprises a cowl panel, 10, a tonneau panel, 11, a front seat panel, 12, and side panels, 13, 14 and 15, the side panels, 14 and 15, being beneath the doors, 16 and 17, while the side panels, 13, extend between said doors. The chassis frame of the motor vehicle is of the usual construction and includes channel-shaped side members, 18, shown in Figs. 2 and 5. The body sill, 19, is formed by the channel member lying on its side so that the base of the channel is disposed in a vertical plane and is positioned at the inner side of the sill with respect to the sides of the body. Each of these channel-shaped body sills, one at each side of the body, when in applied position, comprises a lower horizontally disposed side wall, 20, a base portion, 21, disposed in a vertical plane and an upper side wall made up of the portions, 22 and 24, which extend horizontally and the offset, vertically-disposed portion, 23. Said offset, vertically-disposed portion, 23, forms a seat or recess in which the ends of the floor boards, 25, are received. The side panels, 13, 14 and 15, and the cowl panel, 10, are curved longitudinally to conform to the contour and lines of the body and, if desired, the outer edges of one or the other or both of the side walls, 20 and 24, of the channel sill, 19, are cut to conform to this curvature, so that said edge or edges may conform to the curvature of the body panels. The cowl panel, 10, and the side panels, 13, 14 and 15, each have an inwardly-extending flange, 29, at their lower edges, which flanges are secured, by welding or otherwise to the channel sill member and, preferably, to the lower side wall, 20, of the channel sill. I have shown one satisfactory arrangement wherein the flanges, 29, lie beneath and are secured to the lower surface of the side wall, 20, although, obviously, the invention is not to be limited or restricted in this respect.

At the door openings, the side panels, 13 and 15, are provided with inturned threshold flanges, 27, which are secured rigidly, by welding or otherwise, to the portion, 24, of the upper side wall of the channel sill, 19. In the particular arrangement shown, to which, however, I am not to be restricted, the threshold flanges lie over and upon the upper surface of the side wall, 24. In this case the threshold flange, 27, may terminate in a half round bead, 28, forming a stop for the lower edge of the door, if desired. If it is found to be desirable to reinforce the body sill at the door openings, or at other places, I may do this by inserting and rigidly securing in place, between the side walls of the sill, channel-shaped spacing brackets, 26, as shown in Figs. 2 and 3. Instead of such channel-shaped spacing brackets, I may use U-shaped brackets, 30, having legs, 31, terminating in feet, 32, secured to one side wall of the sill, as shown in Fig. 4. It will be observed that this channel sill construction provides a straight girder extending longitudinally from one end of the sill to the other, substantially in line with the side member, 18, of the chassis frame to which the body sill is secured. This gives a very advantageous straight sill construction but it will be observed that the free edges of the side walls of the channel sill follow the curvature of the sides of the body. My improved sill is so constructed that the only parts which are formed to a curve are the outer edges of the side walls, 20 and 24, one or both, and those edges are formed by the blanking operation by which the blank is produced from which the sill is formed. The channel-shaped sill may be formed from this blank by straight bending or flanging operations and it will be observed that the portions, 20, 21, 22, 23 and 24, are all plane surfaces extending at right angles to each other so that there is no necessity for expensive forming dies for use in forming these portions of the sill. This results in a considerable reduction of the cost of manufacture. It will also be observed that the same blank may be used for making both right-hand and left-hand sills. The sill construction is so connected with the side panels as to provide very strong box girders at the door thresholds to take the strains arising at that point from persons entering or leaving the automobile.

I am aware that the sill construction disclosed in this application may be varied considerably without departing from the spirit of my invention and, therefore, I desire to claim my invention broadly, as indicated by the appended claims.

Having thus described my invention, what

I claim as new and useful and desire to secure by Letters Patent is:

1. In a sheet metal body structure for automobiles, a body panel curved longitudinally to conform to the contour of the body, in combination with a body sill of channel shape in cross section, said sill having its base portion disposed in a vertical plane, the lower edge portion of the panel extending across the open mouth and secured to the lower side of the side wall of the channel of the sill.

2. In a sheet metal body structure for automobiles, a body panel curved longitudinally to conform to the curvature of the body in combination with a body sill of channel shape in cross section, the free edges of the side walls of the channel being curved longitudinally to conform to the body curvature, the lower edge portion of the body panel secured to said sill.

3. In a sheet metal body structure for automobiles the combination with a body panel curved longitudinally to conform to the curvature of the body and having an inwardly-extending flange at its lower edge, of a body sill comprising a channel member lying on its side with the lower side wall thereof rigidly secured to said inwardly-extending flange, the free edge of the lower side wall being curved longitudinally to conform to the body curvature.

4. In a sheet metal body structure for automobiles the combination with a body panel curved longitudinally to conform to the curvature of the body and having an inwardly-extending flange at the lower edge thereof, of a body sill comprising a channel member lying on its side with said flange rigidly secured to the lower side wall of said channel, said panel being flanged to engage the upper side wall of said channel at the door opening to form a box girder from said sill and panel at such points.

5. In a sheet metal body structure for automobiles the combination with a body panel curved longitudinally to conform to the curvature of the body and having an inwardly-extending flange at the lower edge thereof, of a body sill comprising a channel member lying on its side with said flange rigidly secured to the lower side wall of said channel, said panel being flanged to engage the upper side wall of said channel at the door opening to form a box girder from said sill and panel at such points, the free edge of one of the side walls of said channel being longitudinally curved to conform to the body curvature.

6. In a sheet metal body structure for automobiles, a body panel curved longitudinally to conform to the curvature of the body and having an inturned flange at its lower edge, in combination with a body sill of channel shape in cross section, said sill having its base portion disposed in a vertical plane, the free edges of the said sills of the channel presenting towards the body panel, the flange at the lower edge of the body panel secured to the lower side wall of the sill, and spacing brackets disposed within the channel of the sill, and between the side walls thereof.

7. In a sheet metal body structure for automobiles the combination with a body panel curved longitudinally to conform to the curvature of the body and having a laterally extending flange at its lower edge, of a body sill comprising a channel member lying on its side, with its lower side wall rigidly secured to said flange and said panel being flanged to engage and be secured to the upper side wall of said channel at the door opening, to form a box girder threshold, and a plurality of spacing brackets interposed between said side walls of the channel in said box girder.

8. A sheet metal body structure for automobiles, including a body panel curved longitudinally to conform to the curvature of the body, in combination with a body sill of channel shape in cross section, said channel presenting outwardly having its base portion lying inwardly and longitudinally straight throughout its length, and disposed in a vertical plane, the lower edge portion of the body panel secured to said sill.

9. A sheet metal body structure for automobiles, including a body panel curved longitudinally to conform to the curvature of the body, and a body sill of channel shape in cross section, said sill having its base portion disposed in a vertical plane, the lower edge portion of the panel secured to said body sill, said base portion being longitudinally straight throughout its length, in combination with a chassis frame having a longitudinally extending side member, the lower side wall of the sill mounted upon and secured to said side member in parallel relation thereto.

10. A sheet metal body structure for automobiles comprising body panels curved to conform to the body curvature, and a body sill channel shaped in cross section, disposed at each side of the body, the lower edge portions of the body panels at opposite sides of the body secured to said respective sills, the base portion of each sill being disposed in a vertical plane with the free edges of the walls of the channel presenting towards the body panel.

11. A metal sill for automobile bodies comprising a channel member having a vertically disposed base and side walls lying in planes substantially perpendicular to said base, the free edges of one of said side walls being curved longitudinally.

12. A metal sill for automobile bodies comprising a channel member having a vertically disposed base and side walls lying in planes substantially perpendicular to said base, the upper side wall having a longitudinally extending shoulder formed therein.

13. A metal sill for automobile bodies, consisting of a metal blank of channel shape in cross section, the base portion of the channel being straight throughout its length, and the free edges of the side walls of the channel being longitudinally curved.

In testimony whereof, I affix my signature.

WALTER M. TROUT.